G. DE FERNANZO.
SHOCK ABSORBER.
APPLICATION FILED APR. 13, 1914.
1,144,530.
Patented June 29, 1915.
2 SHEETS—SHEET 1.
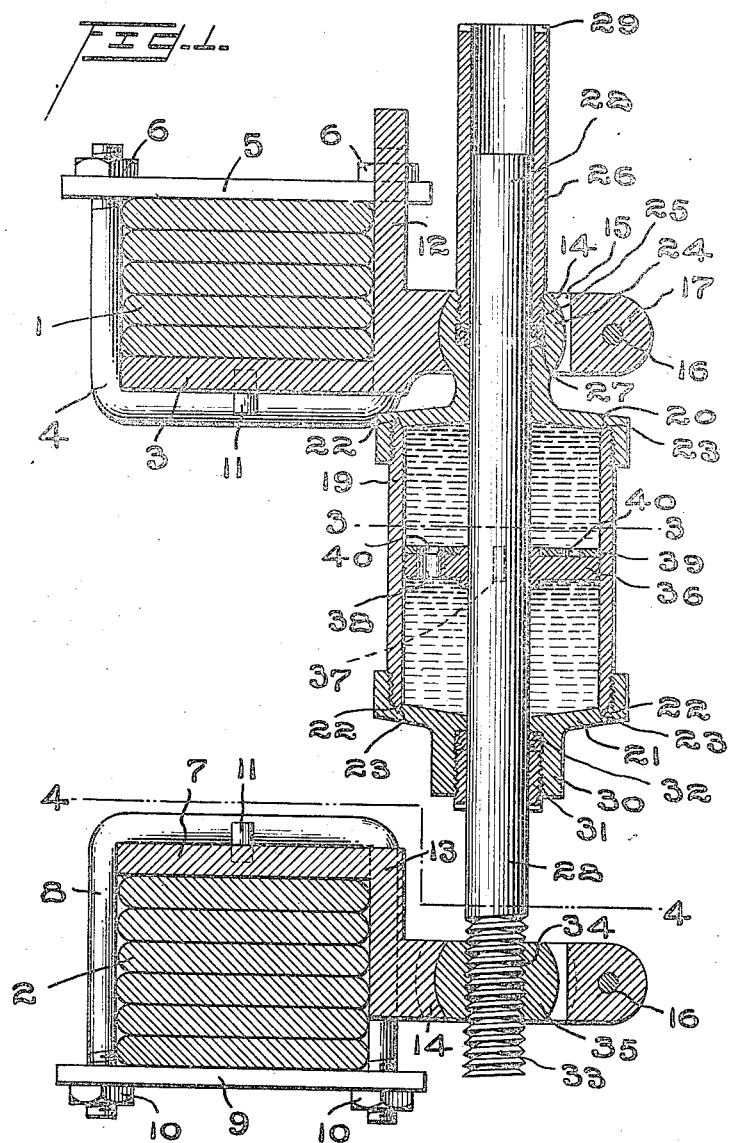
Witnesses
L. P. Moyer
C. R. Ziegler
Inventor
Garibaldi DeFernanzo
By Joshua R. H. Potts
Attorney

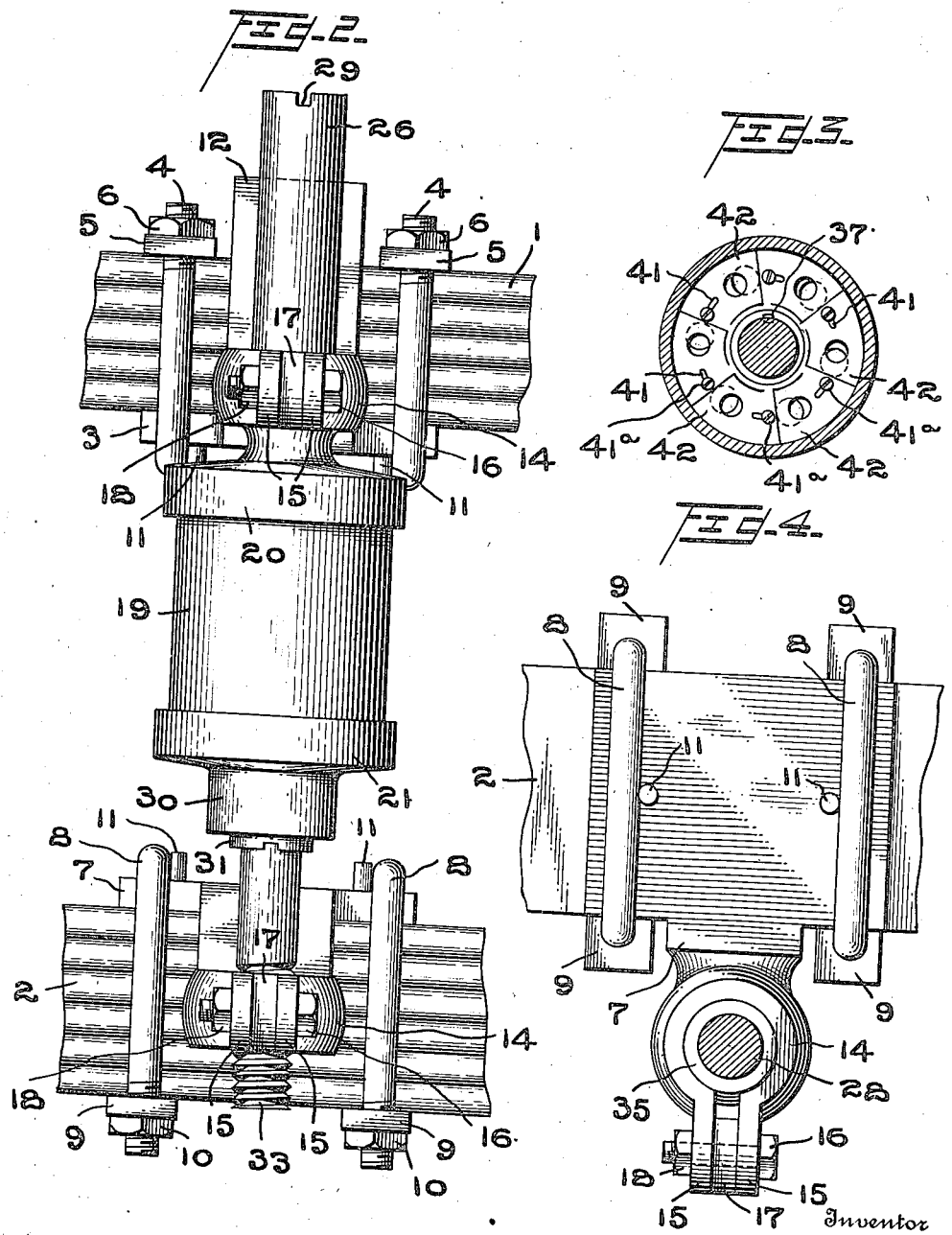

UNITED STATES PATENT OFFICE.

GARIBALDI DE FERNANZO, OF PHILADELPHIA, PENNSYLVANIA, ASSIGNOR OF ONE-THIRD TO LOUIS MORLEY, OF PHILADELPHIA, PENNSYLVANIA.

SHOCK-ABSORBER.

1,144,530.  Specification of Letters Patent.  Patented June 29, 1915.

Application filed April 13, 1914. Serial No. 831,361.

*To all whom it may concern:*

Be it known that I, GARIBALDI DE FERNANZO, a citizen of the United States, residing at Philadelphia, in the county of Philadelphia and State of Pennsylvania, have invented certain new and useful Improvements in Shock-Absorbers, of which the following is a specification.

My invention relates to improvements in shock absorbers, the object of the invention being to provide a shock absorber which resists sudden jars and movements of the spring, compelling the spring to move slowly and easily without jar and jolt, and which absolutely prevents any rebound of the spring, but compels the spring to return slowly to its normal position.

A further object is to provide a shock absorber of the character stated in which an improved arrangement of piston and cylinder is employed with improved means for controlling the by-passing of fluid through the piston as the cylinder or piston move relative to each other.

A further object is to provide improved mounting for the shock absorber which enables the same to operate with equal efficiency at any angle, and which is capable of a wide range of variation in the mounting so as to adapt the shock absorber for any ordinary vehicle.

With these and other objects in view, the invention consists in certain novel features of construction and combinations and arrangements of parts, as will be more fully hereinafter described and pointed out in the claims.

In the accompanying drawings: Figure 1 is a view in vertical longitudinal section illustrating my improvements. Fig. 2 is a fragmentary view in elevation of Fig. 1. Fig. 3 is a view in transverse section on the line 3—3 of Fig. 1, and Fig. 4 is a view in transverse section on the line 4—4 of Fig. 1.

1 and 2 represent supporting members for the respective ends of my improved shock absorber, and while in the present instance I have illustrated these supporting members as constituting the two sections of an elliptical spring, I would have it understood that the invention is not limited to any such use, but may be applied to any supports in which one of the supports is movable relative to the other.

An angle bracket 3 is secured to the upper support 1 by means of U-bolts 4 which extend under the horizontal member of the angle bracket, and through transverse bars 5 on the upper edge of the support, said U-bolts having nuts 6 on their ends to clamp the parts together.

An angle bracket 7 is secured to the lower support 2 by means of U-bolts 8 which extend over the horizontal member of the angle bracket 7 which is on top of the support, and at their lower ends project through a transverse bar 9 and are secured by nuts 10.

The angle brackets 3 and 7 are preferably provided with studs 11 which project from their surface and bear against the U-bolts, preventing any longitudinal movement of the brackets on their supports. The vertical members 12 and 13 of brackets 3 and 7 respectively are provided with spherical sockets 14 and with perforated ears 15 integral with the halves of said sockets to hold the sockets at any adjustment as will hereinafter appear.

To accomplish the adjustment of the sockets, I provide bolts 16 extending through the ears 15 and through spacing blocks 17 between the ears, and at their ends provided with nuts 18 to clamp the parts. The spacing blocks can be removed or replaced or reduced in width as the parts require adjustment.

19 represents my improved cylinder which is provided at its ends with heads 20 and 21 respectively. In the present instance, I have indicated these heads as screwed upon the cylinder with the ends of the latter of general V-shape in cross section as shown at 22, positioned in grooves 23 in the heads, so that when the parts are tightened together, a secure packing is formed. This is particularly true when the V-shaped edge of the cylinder is of a different angle from the groove, so that the pressure in the groove tends to bind or clamp, and while I have shown this particular means for preventing any escape of fluid, I would have it understood that I might employ any style of packing for the purpose, and I might secure the heads on the ends of the cylinder in any way best adapted for the purpose.

The head 20, at one end of the cylinder, is provided with an integral ball 24 which is located in the socket 14 of bracket 3. This ball 24 in its outer end, has a screw-threaded socket 25 for the reception of a sleeve 26 screwed into the socket and constituting a gland compressing a packing 27 around a piston rod 28, which projects through the head 20, ball 24, and into sleeve 26. This sleeve 26 is of such a length as to accommodate the piston in its extreme outward movement, and is provided in its outer end with notches 29 for the reception of a spanner wrench to adjust the sleeve.

The head 21 is provided with a stuffing box 30 for the passage of the rod 28, and in this stuffing box, a gland 31 is screwed to press a packing 32 around the rod. These stuffing boxes, at the respective ends of the cylinder, insure a perfectly tight liquid joint, yet allow the rod to move freely through them.

One end of the rod 28 is screw-threaded as shown at 33, and engages in a screw-threaded opening 34 in a ball 35 located in the socket 14 of bracket 7. By means of this screw-threaded connection, the rod may be adjusted vertically relative to the ball or vice-versa, so that the parts may be adjusted to suit conditions.

A piston 36 is secured to the rod 28 and located within and fits cylinder 19. Piston 36 is preferably brazed to the rod, and a pin 37 is employed to hold the piston in position during its brazing operation, although of course, I do not limit myself to the particular manner of securing the piston to the rod.

It is to be understood that the cylinder 19 will be filled with a fluid of some sort, preferably a liquid consisting of a mixture of alcohol and glycerin, although of course, this particular fluid is not essential to my invention.

The piston 36 is provided with a circular series of openings 38 through which the fluid is adapted to pass from one side of the piston to the other. To control this flow of fluid, I provide a disk 39 which is located against one face of the piston, this being the upper face in Fig. 1. This disk 39 is provided with a circular series of openings 40 which may or may not be smaller in diameter than the openings 38. The disk is cut out forming a circular series of flap valves 42, each flap valve containing an opening 40 above referred to.

The disk 39 is adapted to be adjusted so as to vary the relative positions of the openings 40 with the openings 38. To accomplish this, I provide in the disk a plurality of slots 41 having headed screws 41ª therein screwed into the piston, so that when these screws are loosened, the disk may be turned to vary the relative positions of the openings, and after the proper adjustment is had, the screws may be tightened to hold the disk against movement. By reason of this construction, the by-passing of liquid through the piston can be varied. In other words, when the disk 39 is turned to cut off a portion of each opening 38, the passage of fluid will be resisted to that extent, and hence by adjusting the disk, the by-passing of the fluid may be controlled exactly to suit the load. The valves, however, do not obstruct the flow of fluid in the opposite direction, but only in one direction, which will be the initial movement of the spring.

It will be noted that the upper bracket 3 has a vertical member 12 which is longer than apparently necessary, but I construct the bracket in this way so as to adapt it for use in connection with other parts of the vehicle. The sleeve 26 is of such a length, that when the rod is in an extreme position, it is still covered and protected from damage which it might receive from contact with other objects.

With the parts as indicated, any sudden jolt will cause the upper bracket 3 to move downwardly, the rod 28 and piston 36 standing stationary, and hence the cylinder 19 is caused to move downwardly and the fluid above the piston is forced through openings 38.

The pressure of fluid against the valves 42 partially close the openings 38, so that the flow of fluid is obstructed to this extent, and a sudden movement of the spring is prevented. As the spring attempts to rebound, it will be resisted by the fluid in the cylinder, but to permit the parts to assume their normal position with a reduced resistance, the valves 42 will open and allow the fluid to by-pass through the piston more rapidly in the return movement than in the initial movement so that while all rebound is prevented, the spring is allowed to return easily to its normal position.

While I have shown my improved shock absorber in one of its applications, I would have it understood that I may use the same in various other ways. The parts could be exactly reversed so that the cylinder would be held and the piston moved, and I may employ in connection with my improved shock absorber, various other styles of bracket to secure the same to various parts of vehicles, hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A shock absorber, comprising a cylinder, fluid in the cylinder, a rod projecting through the cylinder, a piston fixed to the rod and having a circular series of openings therethrough for the passage of fluid, a disk secured to one face of the piston, and a circular series of flap valves formed in the disk and having openings adapted to coöperate with the openings in the piston, to control the flow of fluid through the piston, substantially as described.

2. A shock absorber, comprising a cylinder, fluid in the cylinder, a rod projecting through the cylinder, a piston fixed to the rod and having a circular series of openings therethrough for the passage of fluid, a disk secured to one face of the piston, a circular series of flap valves formed in the disk to control the flow of fluid through the piston, means permitting adjustment of the disk, whereby all of the flap valves are adjusted relative to the openings in the piston, substantially as described.

3. A shock absorber, comprising a cylinder, fluid in the cylinder, a rod projecting through the cylinder, a piston fixed to the rod and having a circular series of openings therethrough for the passage of fluid, a disk secured to one face of the piston, and a circular series of flap valves formed in the disk and having openings adapted to coöperate with the openings in the piston to control the flow of fluid through the piston, means permitting adjustment of the disk, whereby all of the flap valves are adjusted relative to the openings in the piston, substantially as described.

4. A shock absorber, comprising a cylinder, fluid in the cylinder, a rod projecting through the cylinder, a piston fixed to the rod and having a circular series of openings therethrough, said disk having a series of radial and curved slits forming in the disk a circular series of flap valves, and an opening in each flap valve adapted to coöperate with an opening in the piston to control the flow of fluid through said openings, substantially as described.

5. A shock absorber, comprising a cylinder, fluid in the cylinder, a rod projecting through the cylinder, a piston fixed to the rod and having a circular series of openings therethrough, said disk having a series of radial and curved slits forming in the disk a circular series of flap valves, an opening in each flap valve adapted to coöperate with an opening in the piston to control the flow of fluid through said openings, each of said flap valves having a slot therein, and set screws in the slots engaging the piston holding the flap valves in any position of adjustment, substantially as described.

In testimony whereof I have signed my name to this specification in the presence of two subscribing witnesses.

GARIBALDI DE FERNANZO.

Witnesses:
M. E. DITTUS,
CHAS. E. POTTS.